A. H. HUGHES AND H. S. CURREN.
HOLDING MEANS FOR CLUTCH LEVERS.
APPLICATION FILED MAR. 27, 1920.

1,382,643. Patented June 28, 1921.

INVENTOR
Allen H. Hughes and
Harold S. Curren
BY
Davis & Simms
Their ATTORNEYS

UNITED STATES PATENT OFFICE.

ALLEN H. HUGHES AND HAROLD S. CURREN, OF ROCHESTER, NEW YORK.

HOLDING MEANS FOR CLUTCH-LEVERS.

1,382,643.   Specification of Letters Patent.   Patented June 28, 1921.

Application filed March 27, 1920. Serial No. 369,185.

*To all whom it may concern:*

Be it known that we, ALLEN H. HUGHES and HAROLD S. CURREN, citizens of the United States, and residents of Rochester, in the county of Monroe and State of New York, have invented certain new and useful Improvements in Holding Means for Clutch-Levers, of which the following is a specification.

The present invention relates to holding means for clutch levers and more particularly to the type of clutch levers in which the clutch lever has a tendency to remain in clutching position, an object of this invention being to provide a holding means which may be readily moved to detaining position for holding the clutch lever in unclutching position and which will upon pressure upon the clutch lever, automatically move away from detaining position. Still another object of the invention is to provide a clutch lever which may be readily mounted upon the tractor known commercially as the "Samson" tractor.

To these and other ends the invention consists of certain parts and combinations of parts, all of which will be hereinafter described, the novel features being pointed out in the appended claims.

Figure 1:
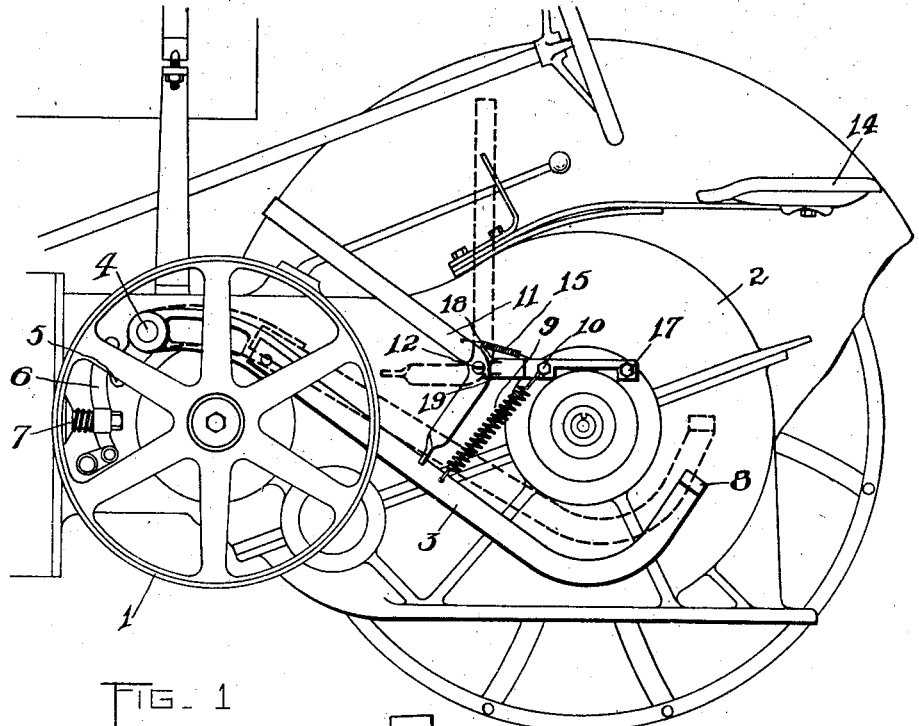
Figure 1 is a fragmentary view of a tractor known commercially as the "Samson" tractor, one of the wheels of the tractor being removed for the purpose of showing clearly the mounting of the holding means.
Figure 2:
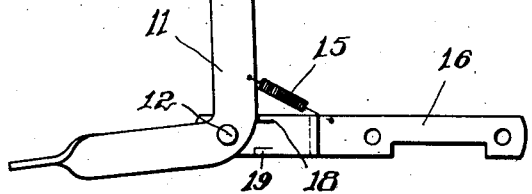
Fig. 2 is a detail side view of the holding means removed from the machine.
Figure 3:
Fig. 3 is a detail plan view of the holding means.

In the tractor known commercially as the "Samson" tractor, a band wheel 1 is provided which is driven from a motor inclosed within the casing 2, a clutch being provided in said casing and being controlled by a lever 3 on the exterior of the casing mounted on a rock shaft 4 connecting with the clutch. This lever at the same time has an extension 5 coöperating with a lever 6 which applies a breaking element 7 to the inner periphery of the band wheel 1 when the clutch lever 3 is depressed through the pedal portion 8 at its rear end so as to break the driving connection between the motor and the band wheel 1. A spring 9 anchored to the lever 3 and to a bolt 10 on the casing 2 acts to normally return the clutch lever to clutching position when such clutch lever is freed.

In the use of this machine, it is desirable at times to hold the clutch lever 3 depressed independently of a foot on the treadle portion 8 and to this end, a detaining means is provided which comprises a lever 11 preferably of bell crank formation pivoted at 12 at a point above the lever 3 and having one arm notched at 13 so as to engage with the upper surface of the lever 3, its other arm extended upwardly so that the one seated upon the seat 14 may by foot pressure upon the upwardly extending arm, move the notched portion 13 of the lower arm of the lever 11 into engagement with the clutch lever 3 and beyond the dead center so that the action of the spring 9 will tend to hold the detent in detaining position until downward pressure is again applied to the clutch lever 3 whereupon the spring 15 will be brought into action and will shift the detaining lever to the dotted line position illustrated in Fig. 1.

The detaining lever may be mounted in any suitable manner but it is preferred to provide a strip 16 which is secured by the bolts 10 and 17 ordinarily provided on the casing of the motor. This strip projects forwardly from the axle so that the pivot 12 is positioned above the clutching lever 3. Stops 18 and 19 are formed on the strip 16 and act to limit the movement of the detaining lever 11 in both directions.

A clutch lever holding means constructed in accordance with this invention is simple in operation and inexpensive to manufacture. It is especially adapted for use with a "Samson" tractor and effectively holds the clutch lever in unclutching position. The release of the detaining member may be effected automatically by pressure upon the clutch lever.

What we claim as our invention and desire to secure by Letters Patent is:

1. In combination with a clutch lever normally movable to clutching position, a detaining member pivotally mounted above the clutch lever to swing to one side of a dead center in order to hold said detaining member in detaining position, and a spring acting on said detaining member to move it to the other side of the dead center in order to free the clutch lever upon a depression of such clutch lever while it is held by the detaining member.

2. In combination with a rearwardly extending clutch lever normally movable to clutching position, a detaining member pivoted above said clutch lever and having two arms, one projecting forwardly and movable downwardly into engagement with said clutch lever to hold the latter in unclutching position, and the other extending upwardly to provide an operating portion for such detaining member, said detaining member having a normal tendency to move away from detaining position so that upon the depression of the clutch lever while the latter is engaged by the detaining member, the detaining member will move to free the clutch lever.

3. In combination with a clutch lever normally movable to clutching position, a bell crank detaining member pivotally mounted above said clutch lever and having one arm movable downwardly into engagement with said clutch lever to hold the latter in unclutching position and the other arm acting as an operating portion for said detaining member, and a spring acting on said detaining member and operating the latter to move it away from detaining position when the clutch lever is moved downwardly while the detaining member is in coöperation therewith.

4. In combination with a clutch lever normally movable to clutching position, a detaining member pivotally mounted above the clutch lever to swing to one side of a dead center in order to hold said detaining member in detaining position, and a spring acting on said detaining member to move it to the other side of the dead center in order to free the clutch lever upon a depression of such clutch lever while it is held by the detaining member, and two stops for limiting the movement of the detaining member in opposite directions.

5. In combination with a clutch lever normally movable to clutching position, a detaining member under the control of the operative, movable to shift said clutch lever to unclutching position and to hold said clutch lever in such position, said detaining member having a normal tendency to move away from detaining position so that upon the depression of the clutch lever while the latter is engaged by the detaining member, the detaining member will move to free the clutch lever.

ALLEN H. HUGHES.
HAROLD S. CURREN.